(12) United States Patent
Han

(10) Patent No.: US 6,999,719 B2
(45) Date of Patent: Feb. 14, 2006

(54) SYMBOL COMBINING DEVICE FOR MULTI-PATH DIVERSITY

(75) Inventor: Sung-Chul Han, Seoul (KR)

(73) Assignee: Samsung Electronics Co., LTD, Kyungki-do (KR)

( * ) Notice: Subject to any disclaimer, the term of this patent is extended or adjusted under 35 U.S.C. 154(b) by 549 days.

(21) Appl. No.: 10/061,091

(22) Filed: Feb. 1, 2002

(65) Prior Publication Data

US 2002/0168935 A1 Nov. 14, 2002

(30) Foreign Application Priority Data

Mar. 21, 2001 (KR) ................................ 2001-14669

(51) Int. Cl.
*H04B 15/00* (2006.01)
(52) U.S. Cl. ............... 455/10; 455/456.1; 455/458; 455/445; 455/132; 370/252; 370/332; 375/267; 375/347; 375/144
(58) Field of Classification Search ............ 455/10, 455/456.1, 458, 445, 132; 370/252, 332; 375/228, 267, 347, 130, 144, 147, 148
See application file for complete search history.

(56) References Cited

U.S. PATENT DOCUMENTS 5,490,165 A * 2/1996 Blakeney et al. .......... 370/335
5,703,902 A * 12/1997 Ziv et al. ................... 375/228
6,154,487 A * 11/2000 Murai et al. ............... 375/150

* cited by examiner

*Primary Examiner*—Nay Maung
*Assistant Examiner*—Alan Gantt
(74) *Attorney, Agent, or Firm*—F. Chau & Associates, LLC

(57) ABSTRACT

A symbol combining device for multi-path diversity includes a plurality of demodulation circuits for demodulating received signals, a common memory for storing outputs of the demodulation circuits, a symbol combiner for receiving the outputs of the common memory corresponding to the demodulation circuits and for combining the outputs, and a memory controller for controlling the common memory to timely separate the write and read operations. To timely separate the write and read operations, the memory controller controls the common memory in order that the demodulation circuits sequentially access the common memory and the resultant outputs of the demodulation circuits are written in the common memory, and the symbol combiner reads the outputs of the demodulation circuits written in the common memory sequentially. Because the deskewer of the symbol combining device is constructed of a single memory, not FIFO by channels, the required number of gates is about 40% of the FIFO by channels, and the size of the symbol combining device is reduced to 40%. Further, the symbol combining device can be easily adaptable to change of the number of channels for various services.

16 Claims, 6 Drawing Sheets

SYMBOL COMBINING DEVICE FOR MULTI-PATH DIVERSITY

Related Application

This application claims priority upon Korean Patent Application No. 2001-14669, filed on Mar. 21, 2001, the contents of which are herein incorporated by reference in their entirety.

1. Field of the Invention

The present invention relates to symbol combining devices, and more particularly to symbol combining devices for multi-path diversities.

2. Background of the Invention

Typically, demodulation fingers of a terminal adaptable to IS-95A/B service have employed more than four units to service the circumstances of multi-path diversity. The at least four demodulation fingers are operated in respective time intervals. A symbol combining device receives data of the demodulation fingers in regular cycles and combines the data of the demodulation fingers, so that for each demodulation finger a deskewer embodied in a first-in first-out device (hereinafter refer to as FIFO), carries out a time-dependent operation for aligning the data.

FIG. 1 shows a conventional symbol combining device, and FIG. 2 shows a conventional deskewer composed of FIFOs arranged by channels. As shown in FIG. 1, demodulation fingers 1~3 demodulate signals of different channels, and the demodulated signals are stored in predetermined positions of corresponding FIFOs 4~6. A symbol combiner 7 reads and combines the demodulated results provided from the demodulation fingers 1~3 stored in the predetermined positions of the corresponding FIFOs 4~6.

As shown in FIG. 2, a read pointer is controlled by the symbol combiner 7, and a write pointer is controlled by the demodulation fingers 1~3. Each FIFO 4~6 is composed of a circular buffer having 8-symbol in depth.

When the deskewer receives signals through each FIFO, a write pointer is increased by one, and a symbol is stored in a position of the increased write pointer. The deskewer corresponding to the FIFOs receive symbols at different times. A symbol arrives earlier at a deskewer which corresponds to previously despread demodulation finger than at other deskewers which correspond to later despread demodulation fingers. However, when the symbols are combined, the symbols are outputted from the same positions of the FIFOs at the same time in consideration of a symbol delay due to influence of multi-path.

An operation of a read pointer in the deskewer controlled by the symbol combiner is as follows. In most applications, a demodulation finger demodulating the first signal that arrives thereat (hereinafter, referred to as a predetermined demodulation finger) provides a reference timing for the symbol combiner. Waiting for a certain period of time (usually five symbols) after a symbol is written by the predetermined demodulation finger, if all of three demodulation fingers receive data, the combiner performs from all of the fingers the read operation. At this time, the positions of a pointer reading a symbol in the FIFOs are the same with those of other reading pointer, and a read pointer is increased by one after the read operation. The following read operation is carried out at a position corresponding to the increased read pointer. Delay times of the write pointer and the read pointer are fixed in the predetermined demodulation finger, and those of the other two demodulation fingers are changed by slewing and time tracking. Most time delays of the write pointer and the read pointer in the predetermined demodulation finger are associated with 5-symbol, but in due consideration of the situation where the predetermined demodulating finger is not tracking the earliest path the FIFO is designed to have a depth of 8-symbol.

FIG. 3 is a timing diagram for write/read operations in conventional FIFOs by channels (or channel-assigned FIFOs). As shown in FIG. 3, a write reset signal which initializes the write pointer of the FIFO in a predetermined cycle (e.g., 26.6 msec) is generated, and then the write operation is performed by the demodulation finger in a corresponding symbol cycle. Aside from this, the read operation is carried out by the symbol combiner in the same symbol cycle. In a conventional symbol combining device, all FIFOs complete the write or read operations at the same point of time.

The size of the FIFO has been extended to eight paths with 8-symbol in depth in IS-95B, from one path with the same depth (i.e., 8-symbol) in IS-95A. Furthermore, in case of a supplemental channel with a high data transmission rate for IS-95C, the FIFO has two paths and 255-word depth as well as compatibility to IS-95B.

Meanwhile, there are several ways to embody an application specific integrated circuit (ASIC) of the FIFO, for instance, by using a memory or a random logic such a flip-flop. Using the random logic is regarded as inefficient for a large scaled FIFO because a size per bit of silicon substrate is almost tired regardless of the size of the FIFO. While the memory is relatively adaptable to the large scaled FIFO because of a smaller size per bit in accordance with an increasing size of the FIFO, it has a disadvantage when several small sized FIFOs are embodied in that the size of the silicon substrate is larger than that of the random logic method.

A demodulation finger adaptable to IS-95B requires eight FIFOs which are simultaneously operational to support one fundamental channel (hereinafter referred to as FCH) and seven supplemental channels (hereinafter referred to as SCH). In the IS-95C, FCH, SCH, a control channel (hereinafter refer to as CCH) needs two FIFOs with 16-symbol, 256-symbol, and 16-symbol in depth, respectively. The number of FIFOs double in IS-95C because symbol data formed of quadrature phase shift keying (hereinafter refer to as QPSK) composes data streams of I-arm (in-phase arm) and Q-arm (quadrature-phase arm).

That is, in order to support the IS-95C service, the FIFO should be constructed with the following features. The size of the FIFO is determined by 'depth×width'.

(1) in radio configurations I and II compatible with IS-95B
  FCH: 16-word×10 bit
  SCH: 16-word×10 bit×7
(2) in radio configurations III, IV, and V dedicating to IS-95C
  FCH: 16-word×10 bit×2
  SCH: 256-word×10 bit×7×2
  CCH: 16-word×10 bit×2

In constructing a structure of the FIFO with the above radio configurations by means of the random logic, a size of a symbol combining device enlarges because a large sized silicon substrate is required.

SUMMARY OF THE INVENTION

An object of the present invention is to provide a symbol combining device having various channels so as to occupy a small area on a substrate.

Another object of the present invention is to provide a symbol combining device easily adaptable to a change of the number of channels, which varies in different modes of operation.

According to an aspect of the present invention, a symbol combining device for multi-path diversity comprises a plurality of demodulation circuits for demodulating received signals, wherein each demodulation circuits demodulates the received signals of different channels; a common memory for storing outputs of the demodulation circuits, a symbol combiner for receiving the outputs of the common memory corresponding to the demodulation circuits and for combining the outputs of the common memory; and a memory controller for controlling the common memory to timely separate the write and read operations. The demodulation circuits sequentially access the common memory, the outputs of the demodulation circuits are written in the common memory, and the symbol combiner reads the outputs of the demodulation circuits written in the common memory sequentially.

Here, in a preferred embodiment, in contiguous write and read operations, the outputs of the demodulation circuits written in the common memory and the output of the demodulation circuits read from the common memory are signals provided to the symbol combining device to compensate for time difference among channels.

In one preferred embodiment, the memory controller determines the number of demodulation circuits accessing sequentially to the memory in response to channel configuration signals determining the number of channels. Further, the common memory may be composed of a number of memories smaller than the number of channels. The write and read operation for each channel are performed at the speed of a main clock of the symbol combining device. The read operation is carried out immediately after the write operation.

According to another aspect of the present invention, a mobile station for wireless communication has a symbol combining device including a plurality of demodulation circuits for demodulating received signals, a common memory for storing outputs of the demodulation circuits, a symbol combiner for receiving the outputs of the common memory corresponding to the demodulation circuits and for combining the outputs of the common memory, and a memory controller for controlling the common memory to timely separate the write and read operations.

Advantageously, a deskewer is constructed of a single memory according to the present invention, not FIFOs by channels. Since the required number of gates of the implementation with a single memory is about 40% of that of the implementation with the FIFO by channels, the invention has the effect of reducing the required size for a symbol combining device to 40%. Further, the symbol combining device in accordance with the present invention can be easily adaptable to a change of the number of channels for various services.

BRIEF DESCRIPTION OF THE DRAWINGS

The present invention will be more clearly understood from the description of the preferred embodiments as set forth below with reference to the accompanying drawings, wherein.

DESCRIPTION OF PREFERRED EMBODIMENTS

Figure 1:
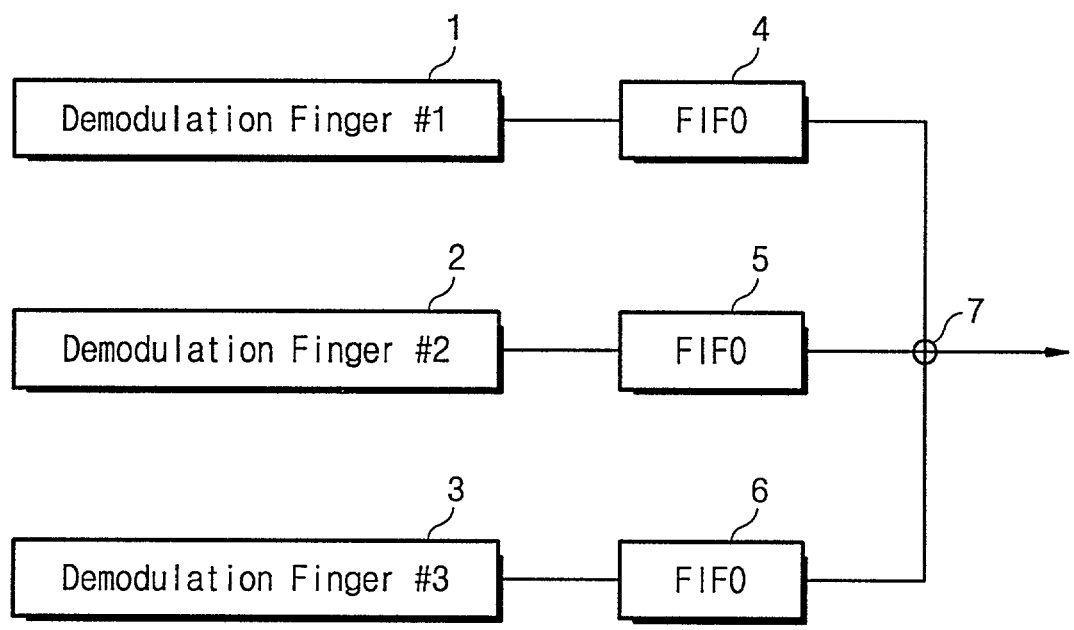
FIG. 1 is a block diagram illustrating a conventional symbol combining device.
Figure 2:
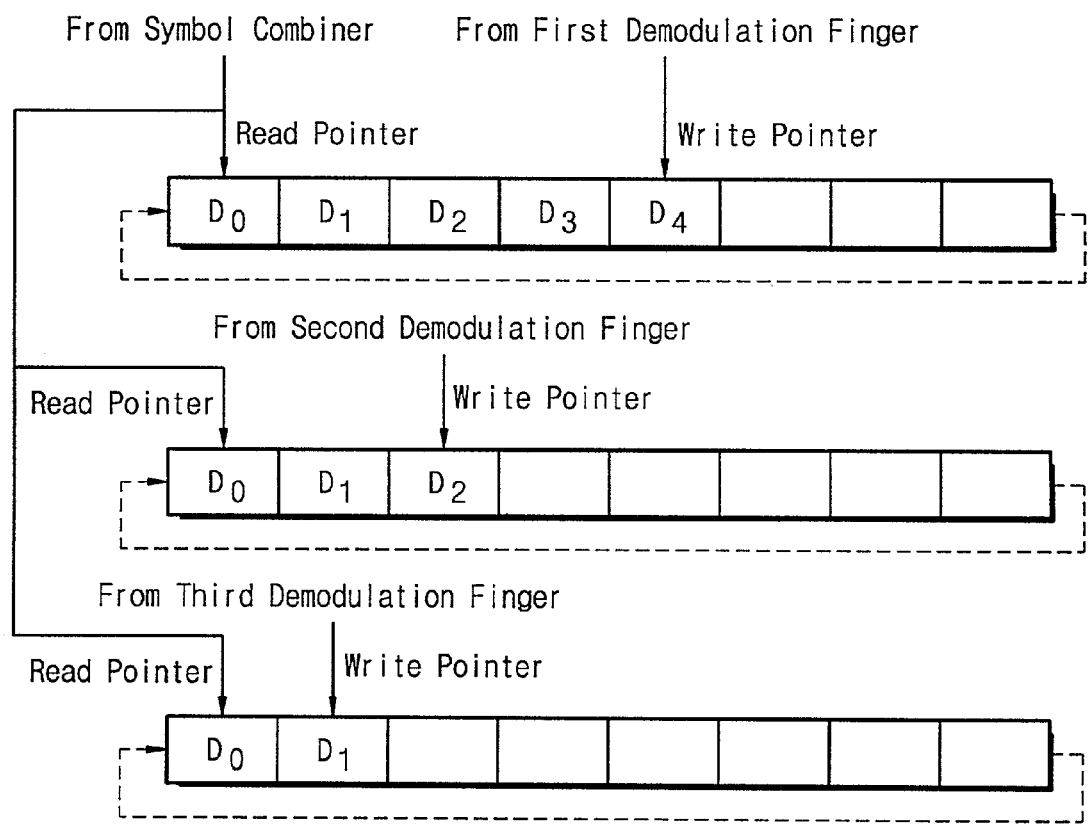
FIG. 2 is a block diagram illustrating a conventional deskewer composed of first-in first-out devices (FIFOs) by channels.
Figure 3:
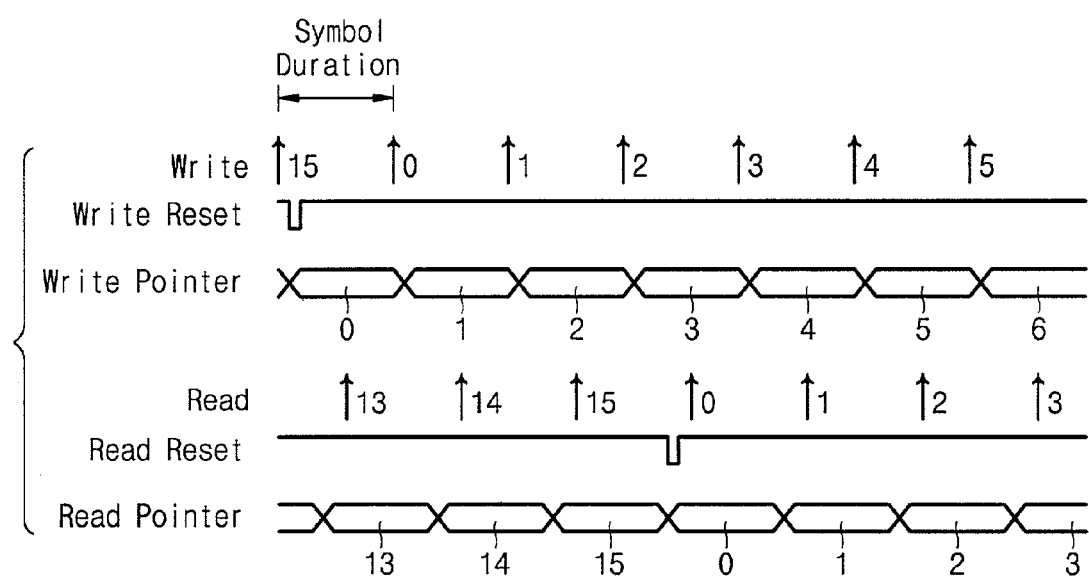
FIG. 3 is a timing diagram for write/read operations in the conventional FIFOs by channels.
Figure 4:
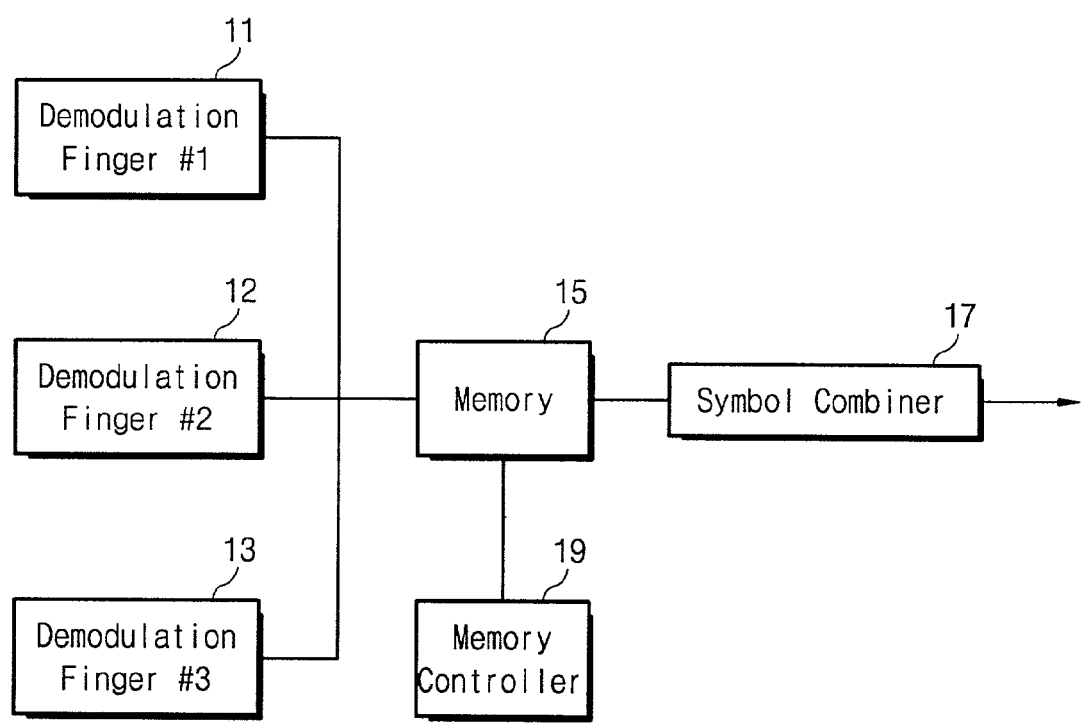
FIG. 4 is a block diagram illustrating a symbol combining device in accordance with the present invention.
Figure 5:
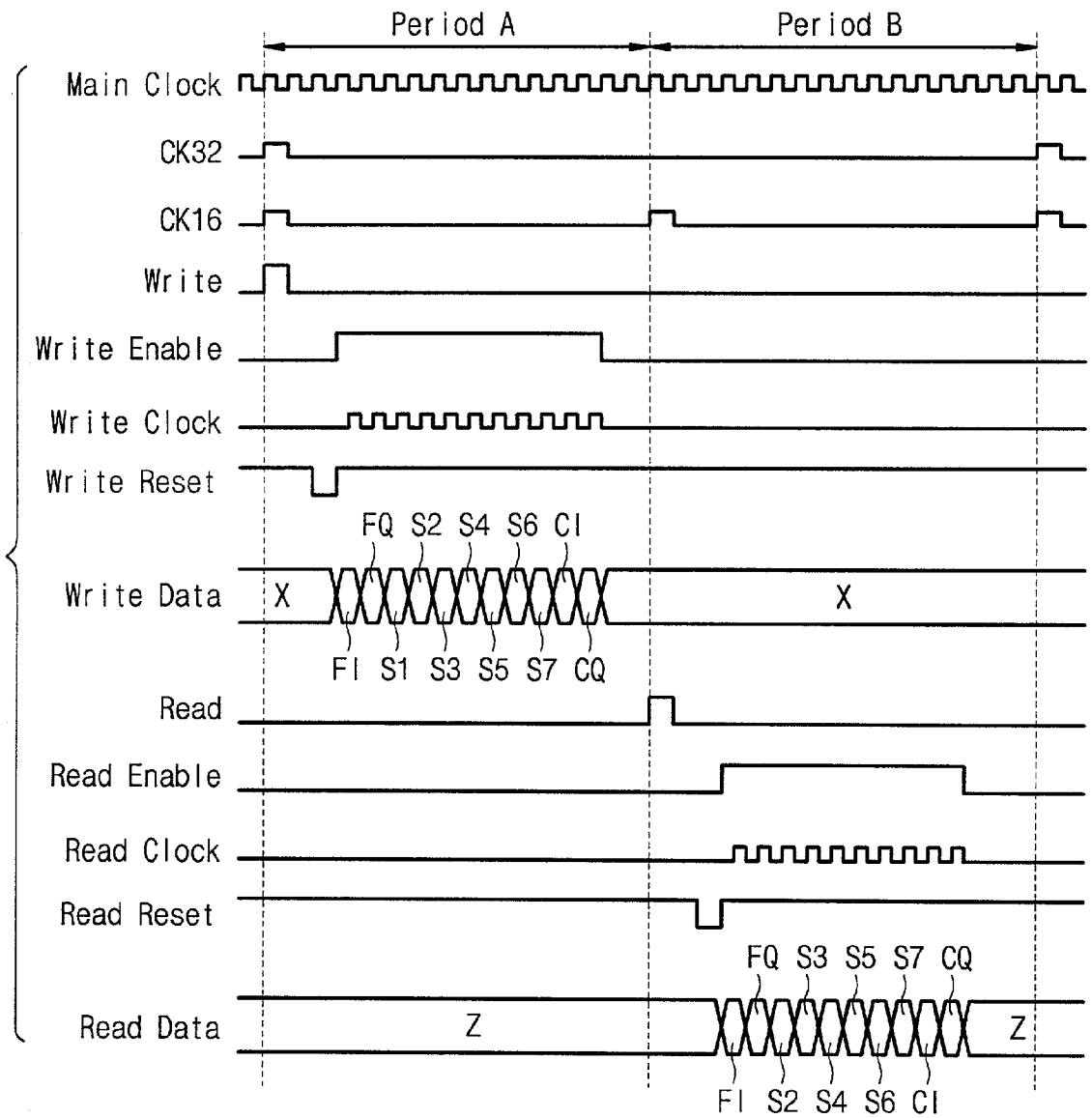
FIG. 5 is a timing diagram of writing/reading a memory for radio configurations I and II, according to the present invention.
Figure 6:
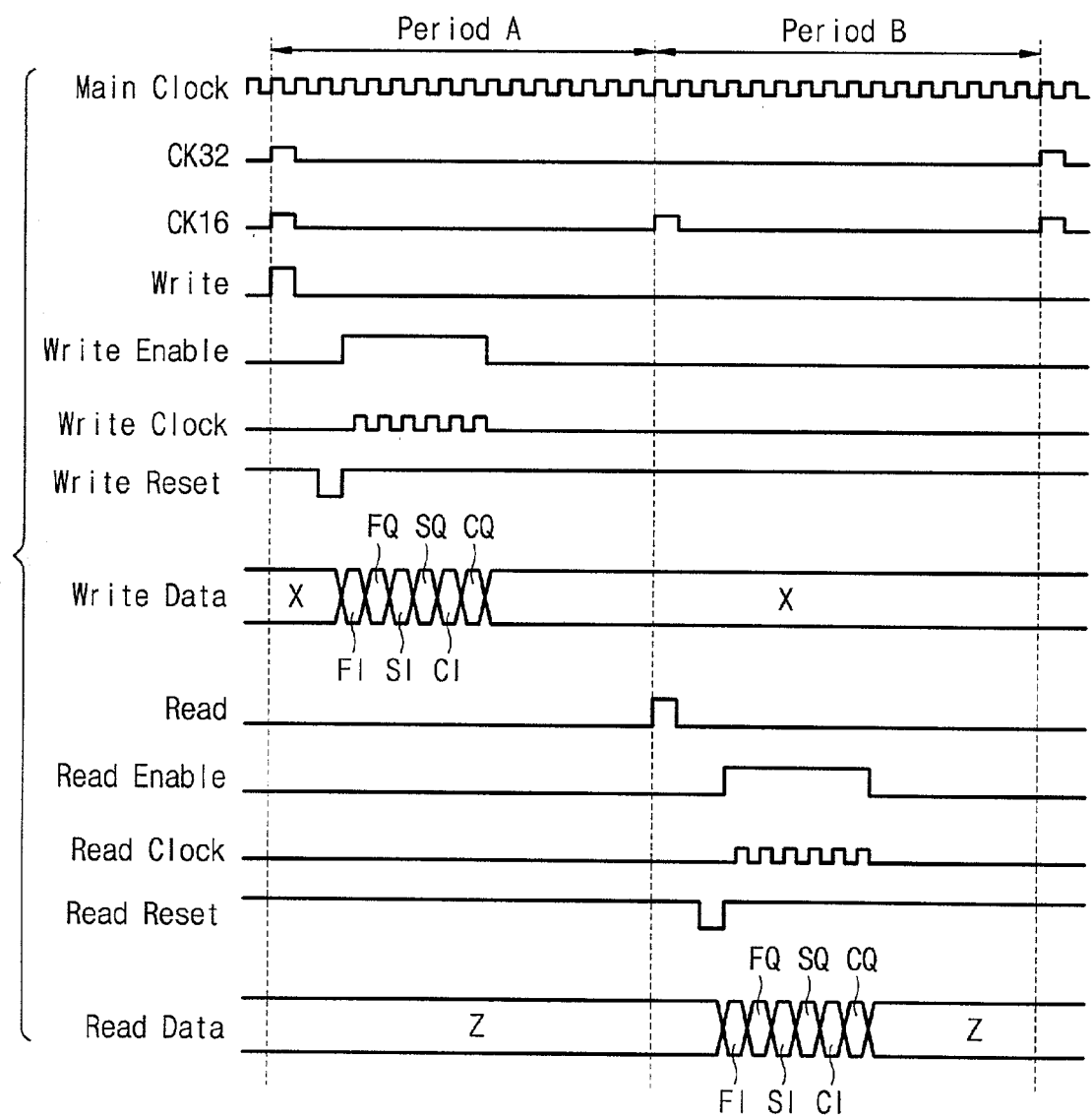
FIG. 6 is a timing diagram of writing/reading a memory for radio configurations III, IV, and V, according to the present invention.

Referring now to FIGS. 4 to 6, preferred embodiments of the present invention will be described below. Elements having same functions are denoted with same reference numbers.

FIG. 4 is a block diagram illustrating a symbol combining device in accordance with the present invention. In a conventional symbol combining device, each demodulation finger needs different FIFOs. Advantageously, a symbol combining device in accordance with the present invention differs from the conventional symbol combining device in that all demodulation fingers 11~13 employ a common memory 15. That is, the deskewers of the present invention are formed of a common memory shared by all the demodulated fingers, while the conventional deskewers are constructed of respective FIFOs by channels.

As shown in FIG. 4, the symbol combining device in accordance with the present invention includes demodulation fingers 11~13 whose number is the same with that of channels, a common memory 15 for writing outputs of the demodulation fingers 11~13, and a symbol combiner 17 for reading and combining the demodulated result written in the memory 15. Each of the demodulation fingers demodulates signals with different channels. Since the conventional deskewers are composed of different FIFOs by channels, they simultaneously write demodulated results and simultaneously read the demodulated results. In the present invention, since a deskewer for a plurality of channels is composed of a single memory, only one data is read or written in the deskewer at a time. Therefore, writing the demodulation fingers 11~13 and reading the symbol combiner 17 need to be properly timed. Such timing is controlled by use of a memory controller, which controls input/output operations of the memory 15. For example, the memory controller writes sequentially in the memory 15 the output of the demodulators and the data can be sequentially read from the memory 15 to output to the symbol combiner 17. Here, the write and read operations for the memory 15 are separated with a time interval. In contiguous write and read operations, the outputs of the demodulation fingers 11~13 to be written in the memory 15 and to be read from the memory 15 correspond to signals introduced thereto with predetermined time differences that distinguishes channels. In a preferred embodiment, an accumulator can act as the symbol combiner 17.

Meanwhile, the number of channels to be processed by a mobile station for wireless communication is variable in accordance with receipt conditions, such as, a kind of service to be required or whether a handoff function is supplied thereto or not. Here, assuming that a control signal instructs that the receiving conditions to act as a channel configuration signal, the number of demodulation fingers to be required for the mobile station will be varied in accordance with the channel configuration signal. Therefore, the symbol combining device equipped in the mobile station has the maximum number of required demodulation fingers, and employs the number of demodulation fingers in accordance with the channel configuration signal. At the same time, memory input and output by the memory controller are sequentially performed in accordance with the number of channels.

In the present illustrative preferred embodiment, the deskewer for all demodulation fingers is comprised of a single memory. However, one skilled in the art can readily appreciate that the deskewer may be embodied in a plurality of memories (e.g., two or three), but the number of memories is smaller than the number of channels, so that at least one of the plurality of memories is common to more than one channel, or the common memory is shared by more than one demodulation fingers.

FIG. 5 is a timing diagram for writing/reading a memory in accordance with a preferred embodiment of the present invention, for purposes of illustration, FIG. 5 shows radio configurations I and II for IS-95C compatible with IS-95B for 32 clock cycles.

Write and read operations are performed in periods A and B, respectively. During the write or read operation, data of every channel is written in the memory 15 separately in the order of FCH-I, FCH-Q, SCH1, SCH2, SCH3, SCH4, SCH5, SCH6, SCH7, CCH-I, and CCH-Q. While it is not always that the read operation is performed right after the write operation, FIG. 5 shows that the read operation is carried out in the immediate adjacent time interval after the write operation.

FIG. 6 is a timing diagram for writing/reading a memory in accordance with another embodiment of the present invention. Again, for purposes of illustration, FIG. 6 shows radio configurations III, IV, and V which are exclusively assigned to IS-95C. Write and read operations are performed in the similar manner shown in FIG. 5, but the data is written or read in the order of FCH-I, FCH-Q, SCH-I, CCH-I, and CCH-Q. When the SCH is established at the maximum transmission rate of 614.4 sps (symbol per second), the read operation is performed right after the write operation. In other cases, the read and write operations may not be carried out successively. At this time, since there is much time to spare during read and write operations, it is possible for a present hardware configuration to supply an additional function requiring a deskewer among functions provided by IS-95C, without additional FIFO.

The write/read timing in accordance with this embodiment is based on hardware operable in the 9.804 main clock. A signal CK32 goes from low to high every 4 PN chip timing and a signal CK16 goes from low to high every 2 PN chip timing (a memory access timing for 32 main clock cycles in shown). In FIGS. 5 and 6, the period A is for write operation only. The period A is from a first point of time to a second point of time. In FIG. 5 or 6, signals CK32 and CK16 are overlapped at the first point of time, and the signal CK32 and CK16 are not overlapped at the second point of time. Here, data of each channel of the demodulation fingers is sequentially written in a memory. During the period B, data of each channel of the demodulation fingers is sequentially read by the symbol combiner. In accordance with the configurations shown in FIGS. 5 and 6, simultaneous write and read conflict can be prevented by dividing the period to write and read. A structure for providing memory address for memory access can be as simple as a counter and a multiplexer.

A memory size using the above described timing is preferably 576 word×10 bit, and the following Table 1 shows an estimated number of gates for the memory and the number of gates of the conventional FIFO by channels.

TABLE 1

| Channel | FIFO by channels | | Single memory | |
|---|---|---|---|---|
| | Size | Number of gates | Size | Number of gates |
| FCH | 16 × 10 × 2 (random logic) | 2950 | | |
| SCH | 256 × 20 × 1 (SRAM) + 16 × 10 × 7 (random logic) | 19942 (9916 + 10326) | 576 × 10 × 1 (SRAM) | 10443 |
| CCH | 16 × 10 × 7 (random logic) | 2950 | | |
| Total | | 25842 | | 10443 |

The number of gates is calculated on a basis of two-input NAND gates. As shown in Table 1, the size of memory can be reduced by about 60% when a deskewer is embodied by using a single memory in comparison when the FIFO by channels is embodied.

The present invention is not limited to the specifically disclosed embodiments, and variations and modifications may be made without departing from the scope of the present invention.

According to the present invention, a deskewer is constructed by using a single memory, not with a different FIFO for corresponding channels. Here, it is shown that the required number of gates is about 40% of the FIFO by channels, the invention has the effect of reducing the required size for a symbol combining device to 40%. Further, the symbol combining device in accordance with the present invention can be easily adaptable to change of number of channels for various services.

It will be obvious to those having skill in the art that many changes may be made in the above-described details of a preferred embodiment of the present invention without departing from the underlying principles thereof. The scope of the present invention should, therefore, be determined only by the following claims.

What is claimed is:

1. A symbol combining device for multi-path diversity comprising:
    a plurality of demodulation circuit for demodulating received signals, wherein each demodulation circuit demodulates the received signals of different channels;
    a common memory for storing outputs of the demodulation circuits;
    a symbol combiner for receiving the outputs of the common memory corresponding to the demodulation circuits and for combining the outputs of the common memory; and
    a memory controller for controlling the write and read operations of the common memory to timely separate the write and read operations;
    wherein, in contiguous write and read operations, the outputs of the demodulation circuits written in the common memory and the outputs of the demodulation circuits read from the common memory are signals provided to the symbol combiner in a predetermined time difference distinguishing the different channels.

2. The device of claim 1, wherein the demodulation circuits sequentially access the common memory, the outputs of the demodulation circuits are written in the common memory, and the symbol combiner reads the outputs of the demodulation circuits written in the common memory sequentially.

3. The device of claim 1, wherein the memory controller instructs the number of the demodulation circuits in accordance with receipt conditions.

4. The device of claim 1, wherein the memory controller instructs the number of the demodulation circuits accessing sequentially to the common memory in response to channel configuration signals determining the number of channels.

5. The device of claim 1, wherein the common memory is composed of a single memory.

6. The device of claim 1, wherein the common memory is composed of a number of memories smaller than the number of channels.

7. The device of claim 1, wherein the write and read operations for each channel are performed at the speed of a main clock of the symbol combining device.

8. The device of claim 1, wherein the read operation is carried out immediately after the write operation.

9. A mobile station for wireless communication having a symbol combining device, wherein the symbol combining device comprises:
   a plurality of demodulation circuits for demodulating received signals, wherein each demodulation circuit demodulates the received signals of different channels;
   a common memory for storing outputs of the demodulation circuits;
   a symbol combiner for receiving the outputs of the common memory corresponding to the demodulation circuits and for combining the outputs of the common memory; and
   a memory controller for controlling the common memory to timely separate the write and read operations;
   wherein, in contiguous write and read operations, the outputs of the demodulation circuits written in the common memory and the output of the demodulation circuits read from the common memory are signals provided to the symbol combiner in a predetermined time difference distinguishing the different channels.

10. The mobile station of claim 9, wherein the demodulation circuits sequentially access the common memory, and the resultant outputs of the demodulation circuits are written in the common memory, and the symbol combiner reads the outputs of the demodulation circuits written in the common memory sequentially.

11. The mobile station of claim 9, wherein the memory controller instructs the number of demodulation circuits accessing sequentially to the common memory in response to channel configuration signals determining the number of channels.

12. The mobile station of claim 9, wherein the common memory is composed of a number of memories smaller than the number of channels.

13. The mobile station of claim 9, wherein the write and read operations for each channel are performed at the speed of a main clock of the symbol combining device.

14. The mobile station of claim 9, wherein the read operation is carried out immediately after the write operation.

15. A symbol combining device for multi-path diversity comprising:
   a plurality of demodulation circuits for demodulating received signals, wherein each demodulation circuit demodulates the received signals of different channels;
   a common memory for storing outputs of the demodulation circuits;
   a symbol combiner for receiving the outputs of the common memory corresponding to the demodulation circuits and for combining the outputs of the common memory; and
   a memory controller for controlling the write and read operations of the common memory to timely separate the write and read operations;
   wherein the memory controller instructs the number of the demodulation circuits accessing sequentially to the common memory in response to channel configuration signals determining the number of channels.

16. A mobile station for wireless communication having a symbol combining device, wherein the symbol combining device comprises:
   a plurality of demodulation circuits for demodulating received signals, wherein each demodulation circuit demodulates the received signals of different channels;
   a common memory for storing outputs of the demodulation circuits;
   a symbol combiner for receiving the outputs of the common memory corresponding to the demodulation circuits and for combining the outputs of the common memory; and
   a memory controller for controlling the common memory to timely separate the write and read operations;
   wherein the memory controller instructs the number of demodulation circuits accessing sequentially to the common memory in response to channel configuration signals determining the number of channels.

* * * * *